(12) United States Patent
Paul et al.

(10) Patent No.: US 7,720,648 B2
(45) Date of Patent: May 18, 2010

(54) METHOD AND APPARATUS FOR ADAPTING THRESHOLD VALUES IN ELECTRONIC SIGNAL PROCESSING DEVICES

(75) Inventors: Steffen Paul, Baierbrunn (DE); Thomas Ruprich, München (DE)

(73) Assignee: Infineon Technologies AG, Munich (DE)

( * ) Notice: Subject to any disclaimer, the term of this patent is extended or adjusted under 35 U.S.C. 154(b) by 1608 days.

(21) Appl. No.: 10/970,905

(22) Filed: Oct. 22, 2004

(65) Prior Publication Data

US 2005/0117666 A1 Jun. 2, 2005

(30) Foreign Application Priority Data

Oct. 28, 2003 (DE) ................. 103 50 261

(51) Int. Cl.
*H04B 15/00* (2006.01)
(52) U.S. Cl. ............... 702/193; 702/70; 327/60; 327/72; 327/74
(58) Field of Classification Search .......... 702/57, 702/60, 66, 69, 70, 63, 74, 85, 189–195, 702/199; 327/50–52, 58, 60, 62, 68–72, 327/74, 75; 455/421, 161.3, 226.2, 254; 375/317–319
See application file for complete search history.

(56) References Cited

U.S. PATENT DOCUMENTS

| | | | | |
|---|---|---|---|---|
| 3,610,901 A | * | 10/1971 | Lynch | ............... 708/300 |
| 4,385,208 A | * | 5/1983 | Tow | ............... 702/70 |
| 5,736,875 A | * | 4/1998 | Sakamoto et al. | ............... 327/74 |
| 5,751,964 A | * | 5/1998 | Ordanic et al. | ............... 709/224 |
| 6,430,715 B1 | * | 8/2002 | Myers et al. | ............... 714/704 |
| 2002/0111158 A1 | | 8/2002 | Tee | |
| 2002/0122557 A1 | * | 9/2002 | Aihara et al. | ............... 380/261 |

FOREIGN PATENT DOCUMENTS

| | | |
|---|---|---|
| EP | 0 381 724 B1 | 8/1990 |
| WO | WO 03/069793 A1 | 8/2003 |

* cited by examiner

*Primary Examiner*—Manuel L Barbee
(74) *Attorney, Agent, or Firm*—Eschweiler & Associates, LLC (57) ABSTRACT

A method for adapting threshold values in an electronic signal processing device, involving a plurality of different threshold values being calculated and being compared with processing variables calculated in the signal processing device, involves calculation of a common correction value which is valid for the various threshold values. The threshold values are then set on the basis of the common correction value.

20 Claims, 8 Drawing Sheets

METHOD AND APPARATUS FOR ADAPTING THRESHOLD VALUES IN ELECTRONIC SIGNAL PROCESSING DEVICES

REFERENCE TO RELATED APPLICATIONS

This application claims the benefit of the priority date of German application DE 103 50 261.0 filed on Oct. 28, 2003, the contents of which are herein incorporated by reference in their entirety.

FIELD OF THE INVENTION

The invention relates to a method and an apparatus for adapting threshold values in electronic signal processing devices, particularly in mobile radio stations.

BACKGROUND OF THE INVENTION

Threshold values are used for signal detection and for decision processes in a multiplicity of signal processing devices. By way of example, the signal power or a processing variable derived therefrom is tested against a prescribed value—the threshold value. Depending on whether the processing variable exceeds the threshold value, a signal is considered to have been detected or a particular decision is made.

By way of example, a threshold value decision can be used to test whether a received signal contains useful data. Normally, these useful data have superimposed disturbances (noise, interference) and need to be separated from these disturbances. By way of example, the received signal is processed in suitable fashion in a radio receiver (e.g., using a correlator) and the processing value is compared with a threshold value. If the processing value exceeds this threshold value, the useful signal is considered to have been detected. Otherwise, it is assumed that the received signal contains exclusively disturbance components.

A considerable drawback of threshold-value-based decisions is the dependency of the decision quality on the average received signal power, since absolute values are compared with one another. The received signal power may fluctuate considerably, however, for example as a result of switching by amplifier stages connected upstream. It thus becomes necessary to adapt the threshold values to the average power of the signal that is to be processed or to be tested.

Figure 1:
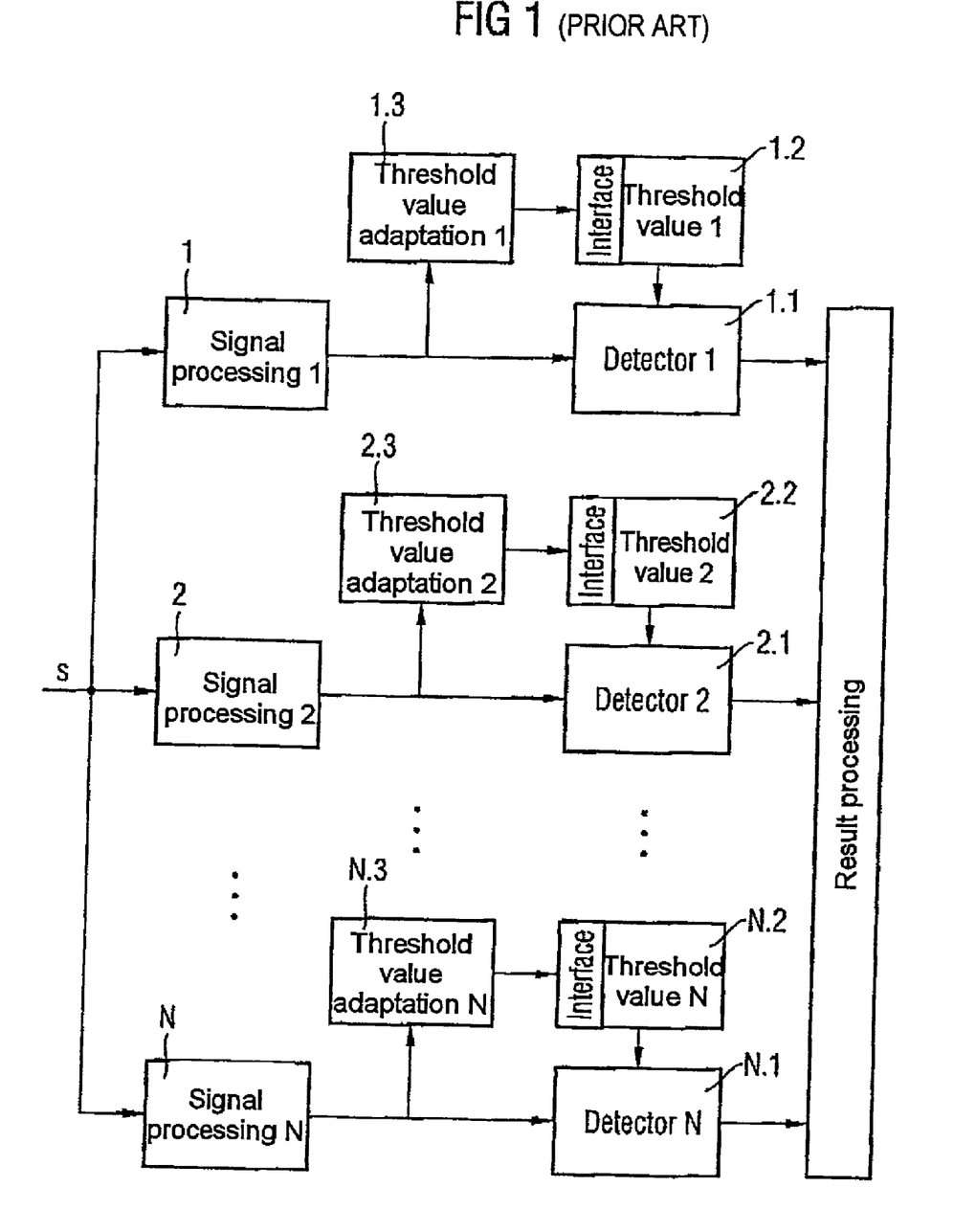
FIG. 1 shows a schematic illustration of a conventional signal processing device with a circuit for calculating threshold values.

FIG. 1 shows the normal approach of a signal processing device based on threshold value decisions. An input signal s is subjected to various signal processing procedures in various signal processing stages 1, 2, ..., N. The respective signal processing stages have detectors 1.1, 2.1, ..., N.1 connected downstream of them which test the processing signal which is output by the respective signal processing stage 1, 2, ... N. The test is performed by comparing the processing signal with a respective threshold value. The respective threshold value is made available to the detector 1.1, 2.1, ..., N.1 by a local threshold value generation stage 1.2, 2.2, ..., N.2. For the requisite threshold value adaptation, local threshold value adaptation stages 1.3, 2.3, ..., N.3 are provided which accept the respective processing signal at their input and make a correction value available at their output. The threshold-value-based correction value is supplied to the respective downstream threshold value generation stage 1.2, 2.2, ..., N.2 via an interface. A result processing section connected downstream of the detectors 1.1, 2.1, ..., N.1 evaluates the threshold value comparison results obtained from the detectors, manages them and then stipulates the further signal processing.

The local threshold value adaptation shown in FIG. 1 works perfectly in terms of function, but has the drawback that calculation of the adaptation values which are output by the threshold value adaptation stages 1.3, 2.3, ..., N.3 requires a high level of involvement overall. Although the processing signals which are output by the signal processing stages 1, 2, ... N are normally different, the usually very complex calculations of the adaptation values in the system are performed a plurality of times at least for some of the computation cycles. This firstly increases the circuit's power consumption and secondly results in an increased surface area requirement for the circuit on account of the high level of circuit complexity.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The invention is directed to a method and an apparatus for adapting threshold values in an electronic signal processing device which is or are able to be implemented with reasonable involvement. In particular, the method and the apparatus are intended to permit a comparatively low power requirement and to bring about a reduction in the circuit complexity for an implementation in hardware.

In line with the inventive method for adapting threshold values, a common correction value which is valid for the various threshold values is calculated. The threshold values are then set on the basis of the common correction value.

Calculating a "global" correction value instead of a multiplicity of threshold-value-specific correction values achieves significant simplification for calculating the individual threshold values. The complexity of the inventive central solution (both in terms of implementation in hardware and in terms of implementation in software) corresponds approximately to the complexity of a single local implementation for calculating a single threshold value. Consequently, the inventive method permits calculation of a plurality of different threshold values with a reduced power involvement and a reduced involvement in terms of circuitry and firmware.

Preferably, the various threshold values are obtained from a scaling for the (common) correction value with a threshold-value-specific setting variable. As a result, the respective threshold values can be set in line with the demands that are made. In the case of a linear relationship between the processing variables calculated in the signal processing device and the centrally ascertained correction value, the scaling can be produced by a simple linear operation. In any case, the correction value which is dependent on the input signal for the signal processing device needs to be calculated only once. Since the complexity for calculating the correction value is generally significantly higher than that for performing the threshold-value-specific scaling operations that may be necessary, an overall complexity or involvement advantage over the conventional approach to threshold value ascertainment explained with reference to FIG. 1 is obtained even when scaling operations are required.

One advantageous variant of the inventive method is that the correction value is proportional to the expected value of the signal power received by the signal processing device. In this case, the signal power is used to calculate all threshold values, which means that a threshold value comparison that is dependent on the signal power is always prompted.

In accordance with one advantageous configuration of the invention, the processing signal is the signal power at the output of a correlator that correlates a signal received in a radio receiver to a code that is known in the radio receiver. As is general knowledge, correlative evaluation of a received signal is performed in a radio receiver in order to establish whether the received signal contains a useful signal. By way of example, prior to setting up a data connection to one or more base stations, a mobile radio receiver needs to synchronize itself to the transmission and reception clocks and then needs to identify the base station (cell) that is emitting the received signal. In this case, one advantageous method variant is characterized in that in a first method step for setting up the data connection the code is a first synchronization code provided for synchronizing the times in the radio receiver and in the base station, and detecting the slot timing (timeslot timing) of the received signal if a threshold value is exceeded. In a second method step, the code used is preferably a second synchronization code provided for synchronizing the times in the radio receiver and in the base station, with the frame timing of the received signal being detected if a threshold value is exceeded. Finally, in a concluding third method step, the correlation code used when setting up the data connection may be a scrambling code, with the cell from which the received signal originates being detected if a threshold value is exceeded.

The inventive apparatus for adapting threshold values in an electronic signal processing device comprises means for calculating a common correction value which is valid for the various threshold values, means for calculating the plurality of different threshold values on the basis of the common correction value, and means for comparing the calculated threshold values with processing variables calculated in the signal processing device. As already mentioned, the inventive advantage is achieved by virtue of just a single correction value needing to be calculated in order to calculate the various threshold values. Accordingly, when the calculation means for the common correction value is implemented in hardware, only a single dedicated hardware circuit for correction value calculation needs to be provided in the integrated circuit.

BRIEF DESCRIPTION OF THE DRAWINGS

The invention is explained in more detail below using examples with reference to the drawings, in which.

DETAILED DESCRIPTION OF THE INVENTION

Figure 2:
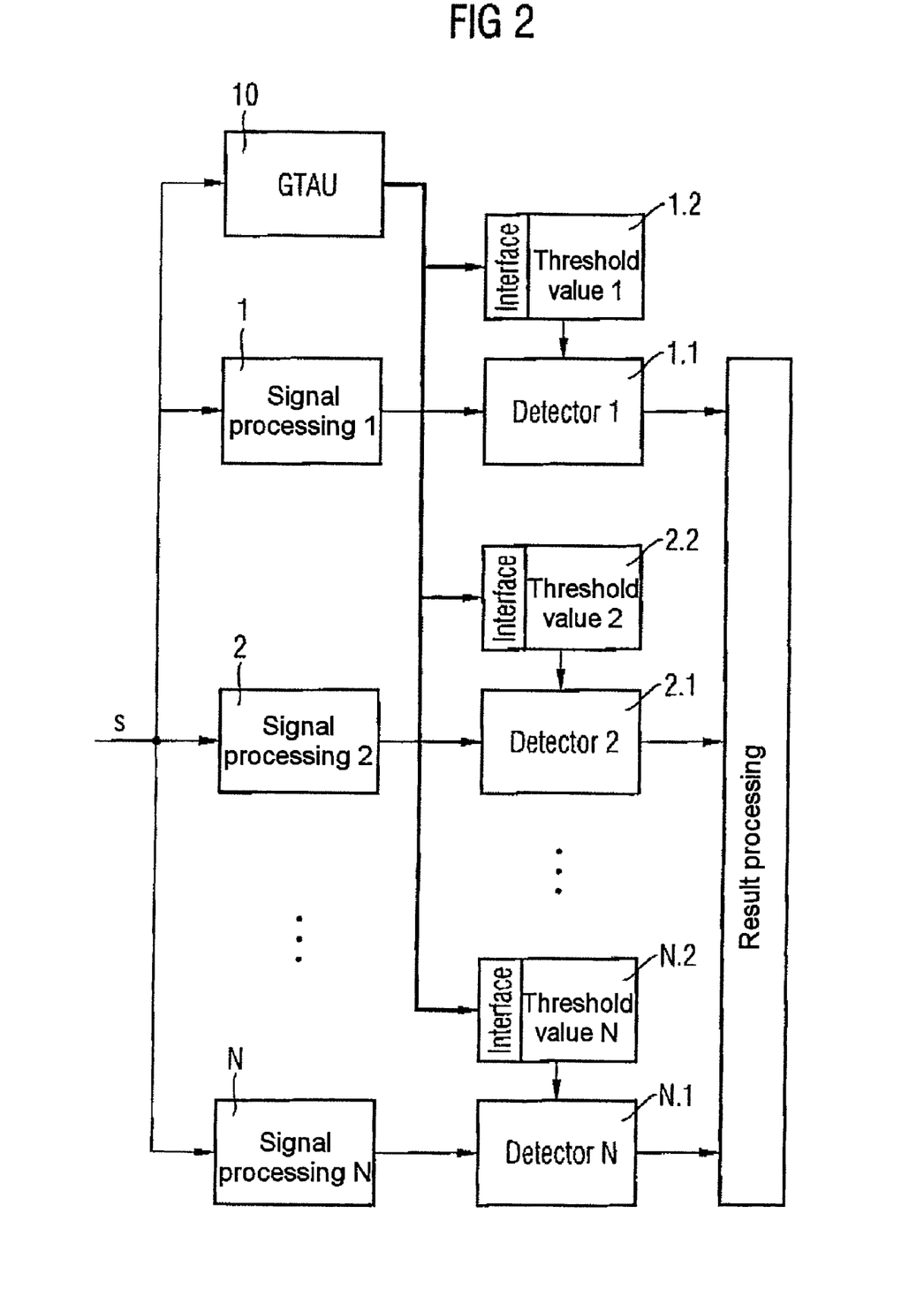
FIG. 2 shows a schematic illustration of an inventive signal processing device with a circuit for calculating threshold values.

In FIG. 2, the same processing blocks as in FIG. 1 have been identified by the same reference symbols. The input signal s is supplied to the signal processing stages $1, 2, \ldots, N$ and additionally to a central threshold value adaptation stage GTAU (Global Threshold Adaptation unit) 10. The central threshold value adaptation stage 10 ascertains a correction value which controls all detectors $1.1, 2.1, \ldots, N.1$ carrying out threshold-value-based signal evaluation or detection. For this purpose, the output of the central threshold value adaptation stage 10 is connected to the respective inputs of local threshold value generation stages $1.2, 2.2, \ldots, 2.N$ via interfaces. The interfaces generally adapt the global correction value to the local demands of the threshold value generation stages $1.2, 2.2, \ldots, N.2$. In the case of a linear relationship between the individual signal processing stages $1, 2, \ldots, N$ and the central threshold value adaptation stage 10, this scaling can be produced by a simple linear operation. The processing variables delivered by the individual signal processing stages $1, 2, \ldots, N$ are not evaluated in order to calculate the common correction value. A comparison between FIGS. 1 and 2 clearly shows that the interfaces of the threshold value generation stages $1.2, 2.2, \ldots, N.2$ in the inventive implementation may need to scale the received correction value in a manner other than in the case of the signal processing device based on the prior art (FIG. 1). This threshold-value-based scaling may, as illustrated in more detail below, either be firmly prescribed or may be variably adjustable or programmable by a controller.

The inventive method and an inventive apparatus are explained in more detail below using an exemplary embodiment.

Figure 3:
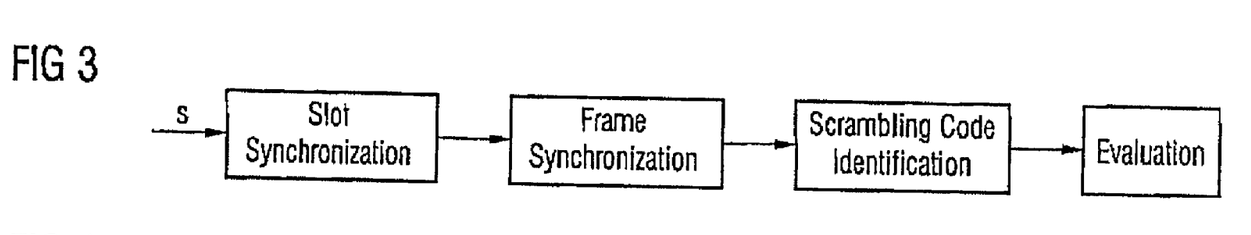
FIG. 3 shows an illustration to explain the synchronization cycle in a mobile radio receiver.

Prior to setting up a data connection to one or more base stations, mobile radio receivers need to synchronize themselves to the transmission and reception clocks. This is generally done using a three-stage method, see FIG. 3: In a first synchronization step, the slot synchronization (timeslot synchronization) takes place. In a second synchronization step, the knowledge of the slot timings is used to ascertain the signal's frame limits (frame synchronization). In a third synchronization step, the scrambling code used by the transmitter (base station) is identified. When these three synchronization steps have ended, further measures for synchronizing the receiver to the base station, such as frequency synchronization and channel estimation, are taken, these being of no significance in the example below and therefore not being considered in more detail.

Figure 4:
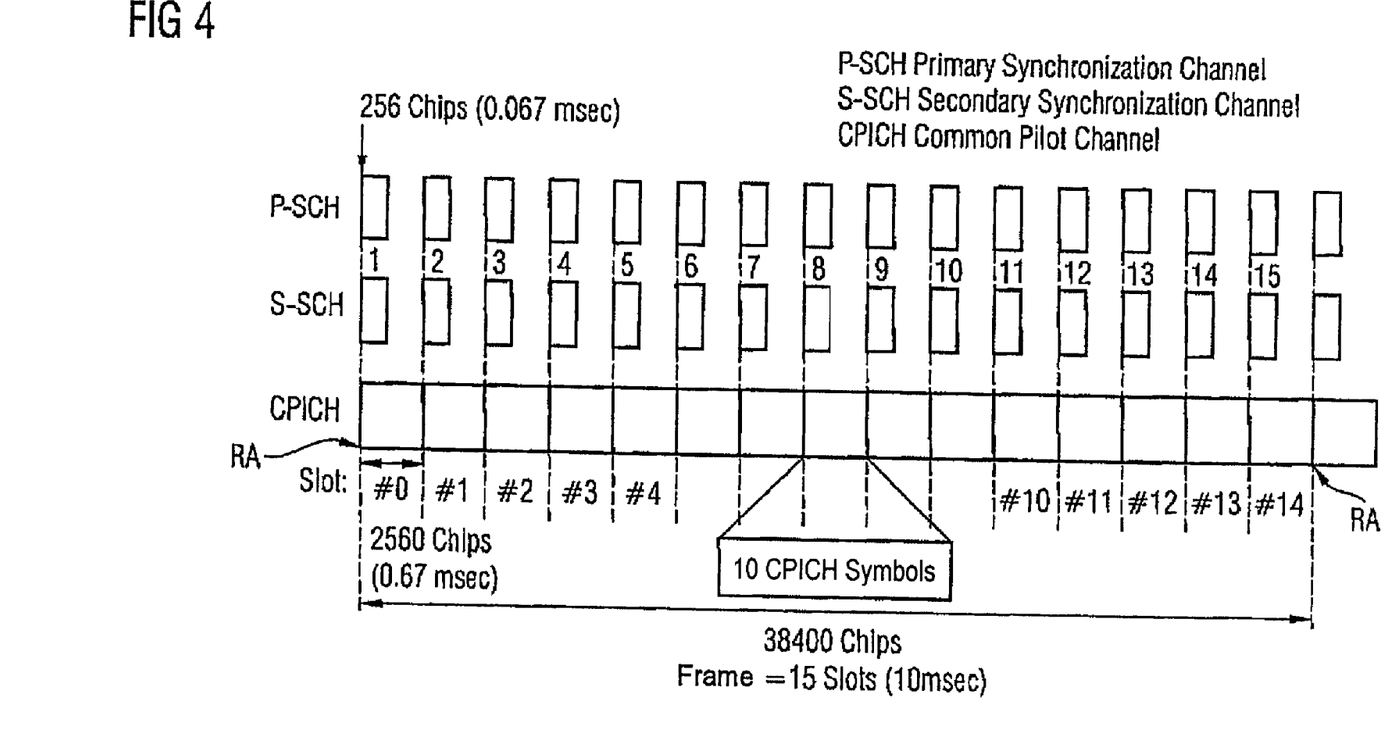
FIG. 4 shows a schematic illustration of the channel structure of the synchronization channel SCH and of the common pilot channel CPICH in the UMTS standard.

As shown in FIG. 4, a UMTS (Universal Mobile Telecommunications System) frame comprises 15 slots. Each slot may contain 2 560 chips. The chip duration is 0.26 µs in the UMTS standard. Consequently, the slot duration is 0.67 ms. The frame duration is 10 ms.

The synchronization of the mobile station to a base station (cell search) involves two UMTS channels, namely the synchronization channel SCH and the common pilot channel CPICH. The synchronization channel SCH comprises a first synchronization channel P-SCH (Primary Synchronization Channel) and a second synchronization channel S-SCH (Secondary Synchronization Channel). In the P-SCH, the base station emits the same respective sequence of 256 chips at the start of every slot. By detecting this sequence that is known in the receiver, the receiver synchronizes itself to the slot timing.

In the S-SCH, the base station likewise emits a sequence of 256 chips at the start of every slot. The sequences broadcast in the individual slots are different, however. The receiver uses the slot synchronization that already exists to detect the different sequences in the S-SCH. Using the detected sequences in the S-SCH, the receiver ascertains those slots which form frame starts RA. In addition, the base station uses the choice and order of the transmitted second sequences to notify the receiver of the code group from which the scrambling code used in the base station originates. This restricts the number of possible scrambling codes, which means that the scrambling code identification taking place in the next step is simplified.

Following the slot and frame synchronization using the SCH, the receiver (mobile station) performs scrambling code identification on the basis of the CPICH. In each slot, 10 CPICH symbols are broadcast. Each CPICH symbol is a sequence comprising 256 chips which is known in the receiver. Since the CPICH has been scrambled using a scrambling code, it can be used to identify the scrambling code used by the base station.

For the individual synchronization steps, the input signal s (which may be the antenna signal which has been downconverted to baseband and digitized using an analog/digital converter) is correlated in correlators to the system-specific codes of the P-SCH for the slot synchronization, of the S-SCH for the frame synchronization and of the CPICH for the scrambling code identification. The output of the respective correlator provides:

$$X(i) = \sum_{k=0}^{K-1} c(k)s(k+i), \qquad (1)$$

where $c(k)$ describes the k-th element (chip) of the respective system-specific code, and $s(k+i)$ denotes the input signal sample received at time $k+i$. In this case, the input signal $s(k+i)$ comprises both useful signal components $e(k+i)$ (transmitted signal) and disturbance signal components (noise, interference) $n(k+i)$. Consequently, the following is true:

$$X(i) = \sum_{k=0}^{K-1} c(k)[e(k+i) + n(k+i)]. \qquad (2)$$

The signal power $X^2(i)$ at the correlator output is the processing variable which is used to determine whether or not the transmitted signal sequence e is detected at sampling time i, and hence it has been possible to produce time synchronism. In this context, $X^2(i)$ has a central chi-square distribution for sampling times i at which the transmitted signal sequence e cannot be detected, and has a noncentral chi-square distribution for sampling times i at which the transmitted signal sequence e can be detected.

Figure 5:
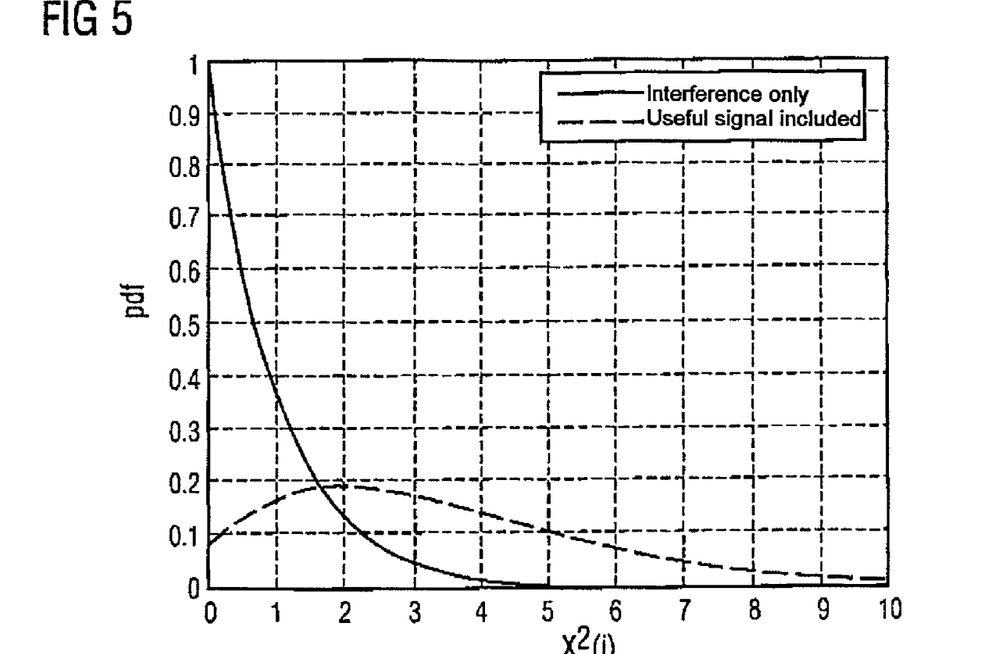
FIG. 5 shows a graphical representation in which the distribution density function pdf of the normalized average signal power at the output of a correlator has been plotted against the signal power.

FIG. 5 shows the distribution density function pdf of the average signal power at the output of the correlator for these two cases, where the normalized average signal input power on the correlator is equal to 1. While the distribution density function pdf falls monotonously with the signal power $X^2(i)$ in the case of an input signal s which is a pure disturbance signal, the distribution density function pdf is at a maximum at a particular signal power $X^2(i)$ in the case of input signal which contains useful signal components.

Figure 6:
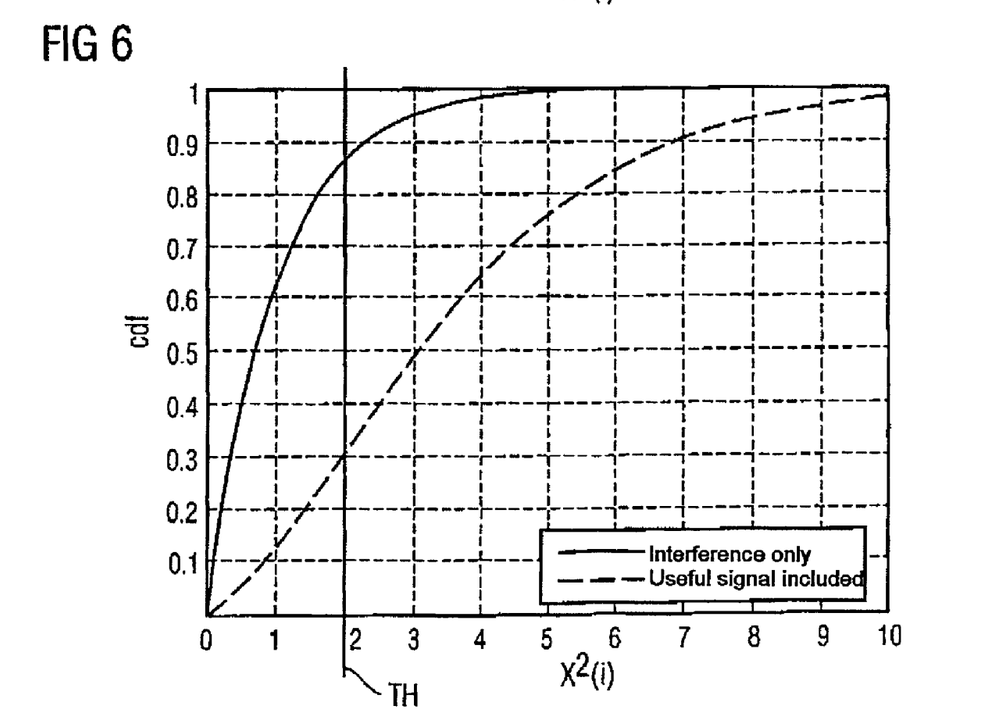
FIG. 6 shows a graphical representation in which the probability distribution cdf of the normalized average signal power at the output of a correlator has been plotted against the signal power.

FIG. 6 shows the associated probability distributions.

Fundamental power criteria in a synchronization apparatus are the detection probability (the probability of an existing useful signal e being detected) and the false alarm rate (the probability of a disturbance being recognized as a useful signal). Both the detection probability and the false alarm rate are significantly dependent on the threshold value settings, particularly with regard to the average input signal power.

Figure 7:
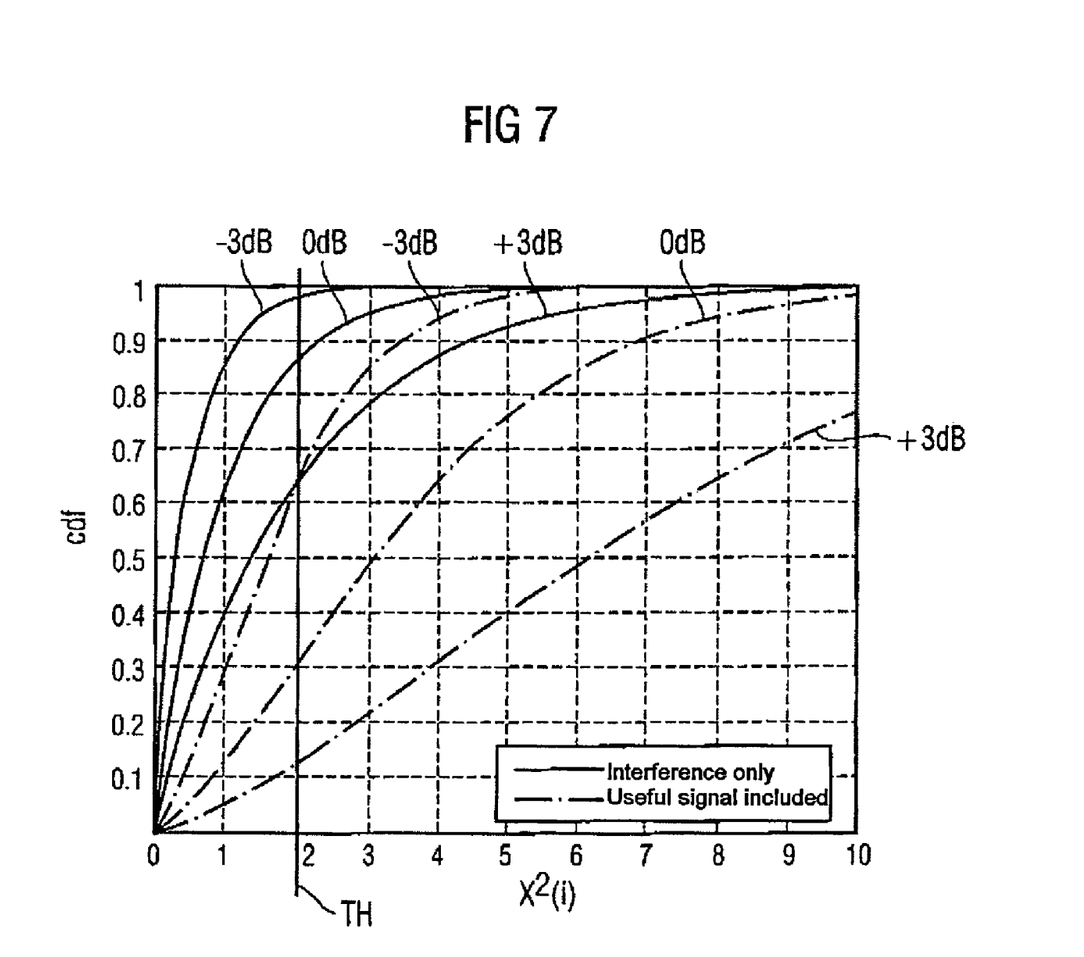
FIG. 7 shows a graphical representation in which the probability distribution cdf of the normalized average signal power at different adaptation values has been plotted against the signal power.

For the circumstances shown in FIGS. 5 and 6, the probability of a disturbance exceeding the threshold value in the case of a normalized threshold value TH=2, for example, is 1−0.86=0.14 (false alarm rate). The probability of a useful signal exceeding the threshold value is 1−0.30=0.70 (detection probability). If the average signal input power changes by +/−3 dB, for example, the prescribed rates cannot be achieved. This is illustrated by FIG. 7, in which the probability distributions of the average signal power at the output of the correlator are shown for an average signal input power changed by the factor 0.5 (−3 dB) and an average signal input power changed by the factor 2 (+3 dB). At a signal input power reduced by −3 dB the false rate alarm is 0.02 and the detection probability is 0.36, while at a signal input power increased by +3 dB the false alarm rate is 0.36 and the detection probability is 0.88.

Consequently, it is necessary to adapt the threshold value TH to the existing signal input power.

Figure 8:
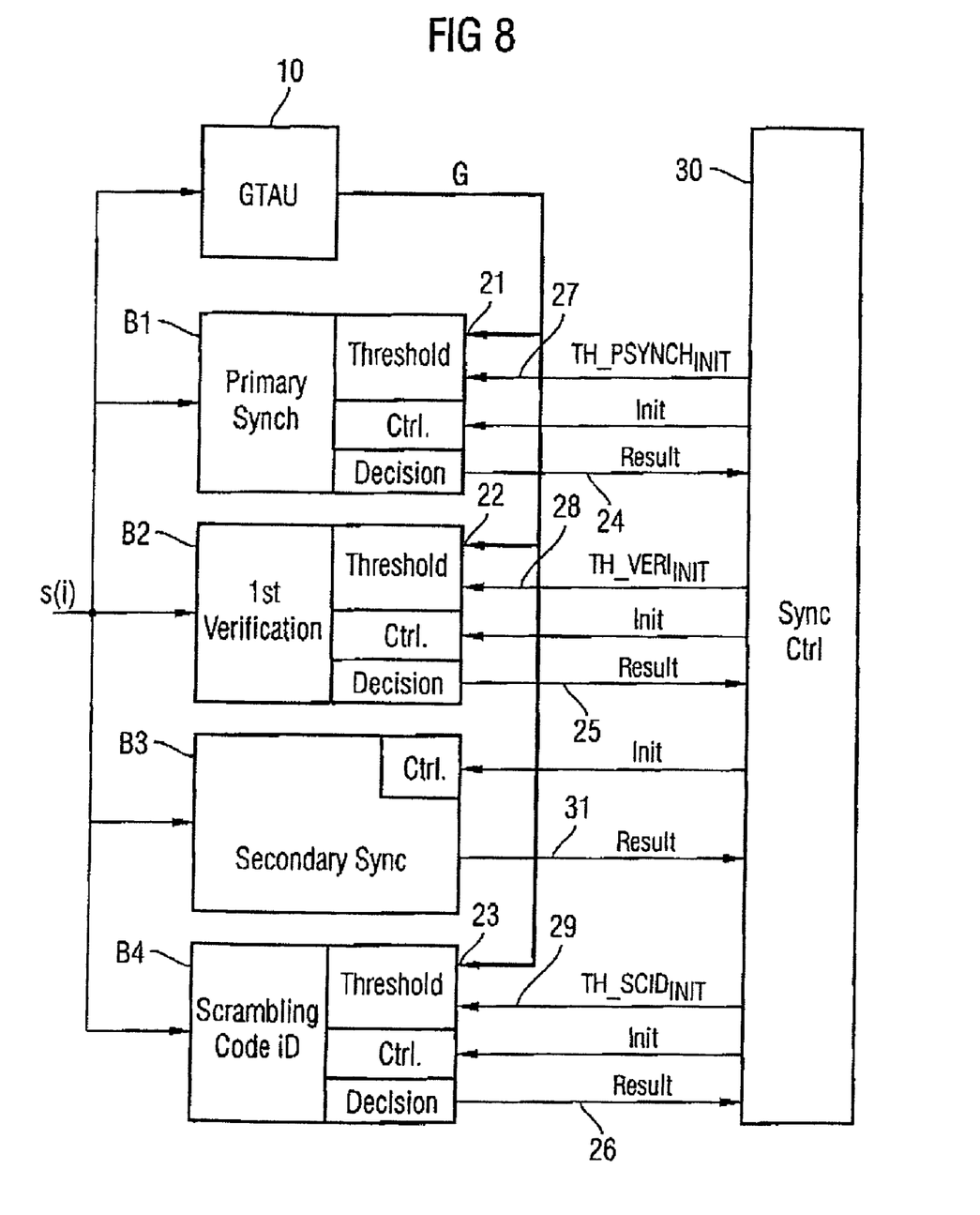
FIG. 8 shows a block diagram of a synchronization unit with central threshold value adaptation for a UMTS mobile station based on the invention.

FIG. 8 shows an inventive synchronization apparatus with adaptive threshold value adaptation. With regard to the design of this apparatus, reference is made to the statements relating to FIG. 2. The input signal s is supplied to the central threshold value adaptation stage GTAU 10 and to four signal processing and threshold value decision blocks B1, B2, B3, B4. The signal processing and threshold value decision blocks B1, B2, B4 contain, in line with FIG. 2, a respective signal processing stage, a detector and a threshold value generation stage. The threshold value generation stages in blocks B1, B2 and B4 each have a correction value input 21, 22 and 23 via which a correction value G calculated in the central threshold value adaptation stage (GTAU) 10 is accepted. The result of the threshold value decision is supplied to a control unit 30 for the synchronization cycle in these blocks via a respective data connection 24 or 25 or 26. The control unit 30 sends blocks B1, B2 and B4 (to be more precise the respective interface of the respective threshold value generation stage) a local adaptation value TH_PSYNCH$_{INIT}$ via a data connection 27, a local adaptation value TH_VERI$_{INIT}$ via a data connection 28, and a local adaptation value TH_SCID$_{INIT}$ via a data connection 29, respectively.

In addition, each block B1, B2, B3, B4 is activated or deactivated by the control unit 30 using a signal Init, by which the control unit 30 (corresponding to the result processing section in FIG. 2) performs flow control. A result ascertained in block B3 is communicated to the control unit 30 via a data connection 31.

The way in which the circuit shown in FIG. 8 works is explained below:

GTAU (Central Threshold Value Adaptation Stage 10):

To calculate the globally valid correction value G, the expected value of the signal input power $E\{s^2\}$ is estimated. A good approximation to the expected value is the mean square $\overline{s^2}$ of the input signal. The averaging can be performed over the length of a slot, for example, where N indicates the number of samples of the input signal within a slot:

$$\overline{s}^2_{MEAS} = \frac{1}{N}\sum_{n=0}^{N-1} s^2(n). \quad (3)$$

The estimated signal input power $\overline{s}^2_{MEAS}$ and the known nominal signal input power $\overline{s}^2_{TARGET}$ give the global correction value G as $$G = \overline{s}^2_{MEAS} \cdot \frac{1}{\overline{s}^2_{TARGET}}. \quad (4)$$

Signal Processing And Threshold Value Decision Blocks B1, B2:

In block B1 (Primary Synch) the time slot synchronization is performed and in block B2 (1st Verification) the verification thereof is performed. In both blocks B1, B2 a correlation based on the code of the P-SCH is respectively performed for each sampling timing for a slot. The correlator output signal is squared, i.e. the signal power is ascertained. In block B2 the signal power is also averaged over a plurality of timeslots on the basis of sampling timing. Finally, the signal power (Block B1) and the averaged signal power (Block B2) are compared with the respective threshold values.

Since the two signal processing sections (Block B1 and Block B2) are based on a correlation to the same synchronization code, the blocks may use the same correlator from the point of view of implementation.

Signal Processing Block B3:

In block B3, the frame synchronization is performed. For this purpose, a correlation based on the synchronization code of the S-SCH is performed for all timing of a timeslot that has been detected as a possible timeslot limit in the course of the slot synchronization and verification in blocks B1 and B2. This ascertains the frame limit RA. This is communicated to the control unit 30 via the data connection 31. Since no threshold-value-based further processing is being performed, no threshold value adaptation is necessary. It is also possible for the frame synchronization to be performed on the basis of threshold values, however.

Signal Processing And Threshold Value Decision Block B4:

In block B4, the scrambling code used at the transmitter end is identified from the CPICH. A correlation based on the P-CPICH (Primary Common Pilot Channel) is performed for all timing of a timeslot that has been detected as a potential network cell in the course of the frame synchronization. The correlator output signal is squared, i.e. the signal power is ascertained, is averaged over a plurality of symbols and is finally compared with a threshold value. If this threshold value is exceeded, then the cell is considered to have been detected.

As already mentioned, the timing of the correlation and detection procedures is controlled by the control unit 30.

Since the correlations in blocks B1/2, B3 and B4 take place in succession, the correlation procedures can be performed using a common, dedicated correlator hardware circuit that can be programmed on a code-specific basis.

The text below gives a more detailed explanation of how the individual threshold values are stipulated in the signal processing and threshold value decision blocks B1, B2, B4.

It is possible to show that the relationship between the expected value of the signal input power $E\{s^2\}$ and the probability of the correlator output power or the mean of the correlator output power exceeding a particular threshold value is linearly dependent. This is the basis for the inventive concept of threshold value adaptation using a global correction value.

Normally, threshold values are optimized for a prescribed false alarm rate. In the text below, an adaptation algorithm for the synchronization apparatus shown in FIG. 8 is specified on the basis of threshold value adaptation for a constant false alarm rate.

The false alarm rate for the slot synchronization is denoted by FA_PSYNCH, the false alarm rate for the verification of the slot synchronization is denoted by FA_VERI, and the false alarm rate for the scrambling code identification is denoted by FA_SCID. The correlator output power for sampling timings that contain only disturbance signal components n (only these configure a false alarm) has a central chi-square distribution, as already mentioned:

$$F_Y(y) = 1 - e^{-\frac{y}{2\sigma^2}} \cdot \sum_{k=0}^{m-1} \frac{1}{k!}\left(\frac{y}{2\sigma^2}\right)^k, y \geq 0 \quad (5)$$

where $y=X^2$ is taken as a basis in the present case. In this context, m is the number of averages taken, $\sigma^2 = 0.5\,\overline{s}^2_{MEAS}$ is true, and y corresponds to a threshold value TH_X (in this case, X represents PSYNCH, VERI or SCID) that is under consideration.

The equation $$F_y(TH\_X)=FA\_X \quad (6)$$

thus represents an implicit equation for calculating the threshold value TH_X from the false alarm rate FA_X.

Typical false alarm rates are, by way of example, FA_PSYNCH=0.64, FA_VERI=5×10$^{-5}$, FA_SCID=5×10$^{-5}$.

The control equation is $$FA\_X(\overline{s}_{MEAS}^2)=\text{const.}, \quad (7)$$

i.e., the false alarm rate will always be constant regardless of the estimated signal input power $\overline{s}^2_{MEAS}$.

Taking into account equations (4), (5) and (7), $$\frac{TH\_X}{\overline{s}^2_{MEAS}} = \frac{TH\_X}{G \cdot \overline{s}^2_{TARGET}} = \text{const.} \quad (8)$$

and also $$TH\_X = G \cdot TH\_X_{INIT}, \quad (9)$$

are obtained, where TH_X$_{INIT}$ corresponds to a threshold value which needs to be set for a prescribed false alarm rate FA_X at a nominal signal input power $\overline{s}^2_{TARGET}$. Taking into account the false alarm rates FA_PSYNCH, FA_VERI and FA_SCID indicated above, the following initial threshold values are obtained by way of example: TH_PSYNCH$_{INIT}$=0.44, TH_VERI$_{INIT}$=1.71 and TH_SCID$_{INIT}$=0.56. These values are calculated in the control circuit 30 and are supplied to blocks B1, B2 and B4 via the data connections 27, 28, 29.

Figure 9:
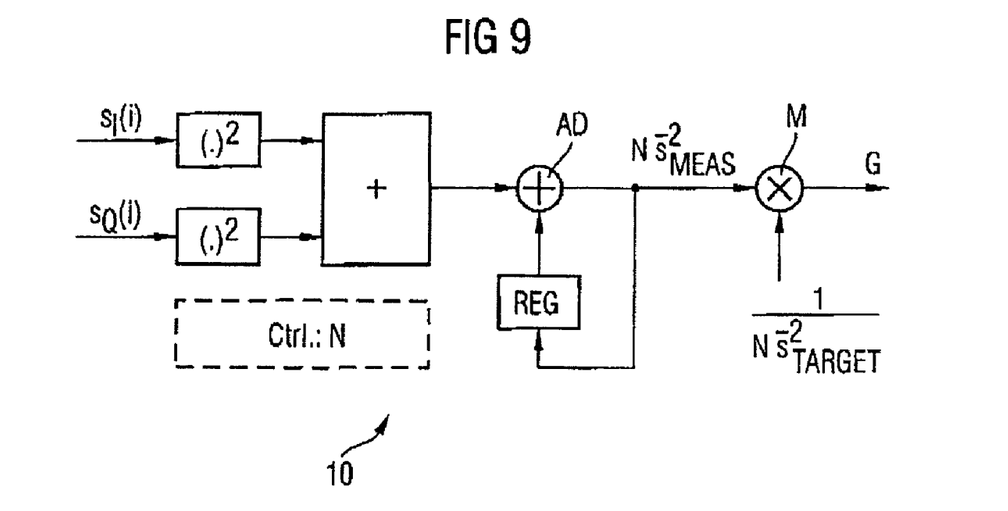
FIG. 9 shows a block diagram of the central threshold value adaptation unit GTAU from FIG. 8.

FIG. 9 shows a circuit diagram of the central threshold value adaptation stage GTAU 10 for calculating the global correction value G. The inphase component $s_I(i)$ and the quadrature component $s_Q(i)$ of the input signal are respectively squared and the squares are summed. The power values ascertained in this manner are accumulated in an accumulator comprising an adder AD and a register REG. The accumulation is performed over N addition operations, i.e. over a slot duration, for example. The value $N \cdot s^2_{MEAS}$ ascertained in this manner is multiplied by the value $1/(N \cdot s^2_{TARGET})$ in line with equation (4).

Figure 10:
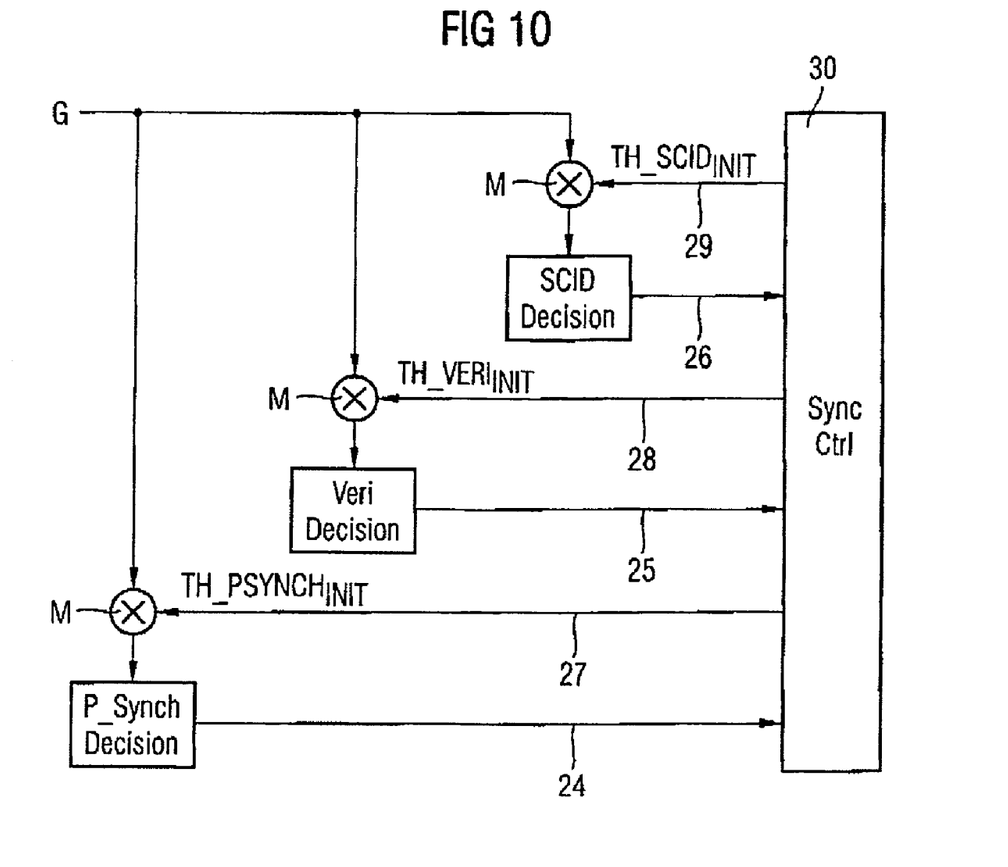
FIG. 10 shows a block diagram of a centrally controlled threshold value adaptation section based on the invention.

FIG. 10 shows a block diagram of the threshold value adaptation centrally controlled using the global correction value G. The threshold value adaptation in the signal processing device shown in FIG. 8 can be provided in line with the circuit in FIG. 10. The scaling or conversion of the global correction value G into local threshold values is performed using respective multipliers M to which the initial threshold value adaptation values TH_PSYNCH$_{INIT}$ (slot synchronization), TH_VERI$_{INIT}$ (verification of the slot synchronization) and TH_SCID$_{INIT}$ (scrambling code identification) are supplied.

Figure 11:
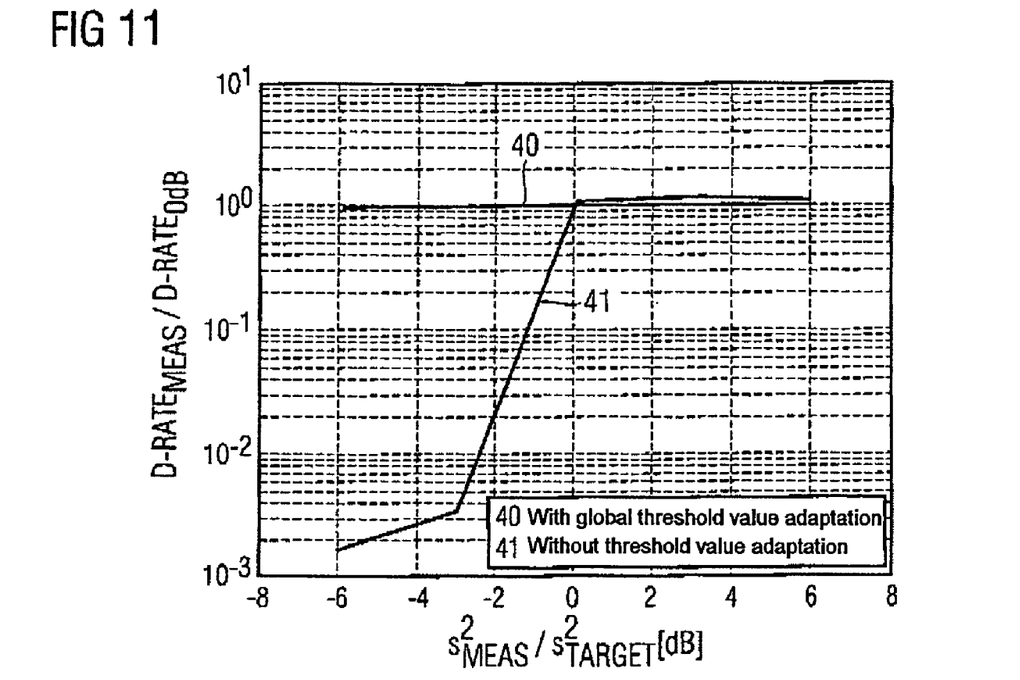
FIG. 11 shows a graphical representation of the detection rate for the synchronization unit shown in FIG. 8 as a function of the average power in the baseband.

FIG. 11 shows the detection rate of the synchronization unit shown in FIG. 8 for a UMTS terminal on the basis of the average power in the baseband. Global threshold value adaptation (curve 30) achieves significantly higher detection rates at low signal powers than no global threshold value adaptation.

Figure 12:
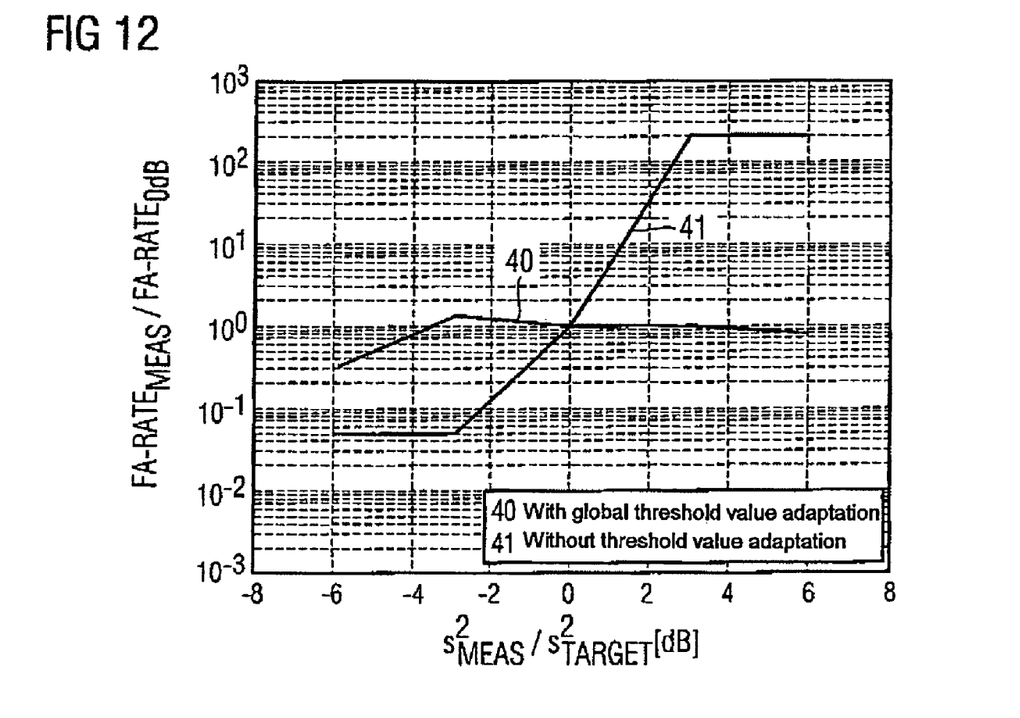
FIG. 12 shows a graphical representation of the false alarm rate for the synchronization unit shown in FIG. 8 as a function of the average power in the baseband.

FIG. 12 shows the false alarm rate of the synchronization unit shown in FIG. 8 for a UMTS terminal on the basis of the average power in the baseband. Global threshold value adaptation (curve 40) achieves relatively constant false alarm rates, whereas a drastic increase in the false alarm rate is observed for rising signal power without threshold value adaptation (curve 41).

Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A method for adapting a plurality of threshold values in an electronic signal processing device, comprising:
   receiving an input signal at the electronic signal processing device;
   calculating on the basis of the input signal a common correction value that is valid for a plurality of different threshold values in the signal processing device;
   calculating the plurality of different threshold values on the basis of the common correction value in the signal processing device;
   calculating a plurality of different processing variables on the basis of the input signal in the signal processing device; and
   assigning and comparing each of the calculated threshold values to a different one of the plurality of processing variables in the signal processing device.

2. The method according to claim 1, wherein the signal processing device comprises a signal processing unit configured to process the input signal.

3. The method according to claim 1, wherein the plurality of threshold values are obtained by scaling the common correction value with a plurality of threshold-value-specific setting variables, respectively.

4. The method according to claim 3, further comprising stipulating one of the threshold-value-specific setting variables such that a prescribed false alarm rate is set for a comparison between one processing variable calculated in the signal processing device and the threshold value that is a function of the one threshold-value-specific setting variable.

5. The method according to claim 1, wherein the correction value is proportional to an expected value of the signal power of the input signal.

6. The method according to claim 1, wherein one processing variable calculated in the signal processing device comprises the signal power at an output of a correlator that correlates the received signal in a radio receiver to a code that is known in the radio receiver.

7. The method according to claim 6, wherein the code comprises a first synchronization code provided for synchronizing slot times in the radio receiver and in a base station, and wherein the slot timing of the received signal is detected if a threshold value associated therewith is exceeded.

8. The method according to claim 6, wherein the code comprises a second synchronization code provided for synchronizing frame times in the radio receiver and in a base station, and wherein the frame timing of the received signal is detected if a threshold value associated therewith is exceeded.

9. The method according to claim 6, wherein the code comprises a scrambling code, and wherein a cell from which the received signal originates is detected if a threshold value associated therewith is exceeded.

10. The method of claim 1, wherein the plurality of processing variables are not determined on a basis of the common correction value.

11. An apparatus for adapting a plurality of different threshold values in an electronic signal processing device receiving an input signal, comprising:
    means for calculating on the basis of the input signal a common correction value that is valid for the plurality of different threshold values;
    means for calculating the plurality of different threshold values on the basis of the common correction value;
    means for calculating a plurality of different processing variables on the basis of the input signal; and
    means for assigning and comparing each of the calculated threshold values with a different one of the plurality of processing variables calculated in the signal processing device.

12. The apparatus according to claim 11, wherein the signal processing device comprises a signal processing unit configured to process the input signal.

13. The apparatus according to claim 11, wherein the means for calculating the plurality of different threshold values is configured to ascertain the plurality of different threshold values from a scaling of the correction value with a plurality of different threshold-value-specific setting variables, respectively.

14. The apparatus according to claim 13, further comprising a control means configured to stipulate one or more of the threshold-value-specific setting variables such that a prescribed false alarm rate is set for a comparison between the processing variables calculated in the signal processing device and the threshold values, respectively.

15. The apparatus according to claim 11, wherein the means for calculating the common correction value is configured to determine the common correction value in proportion to an expected value of the signal power of the input signal received in a radio receiver.

16. The apparatus according to claim 11, wherein the signal processing device comprises a correlator which correlates the received signal in a radio receiver to a code which is known in the radio receiver, and wherein one of the processing variables comprises the signal power at the output of the correlator.

17. The apparatus according to claim 16, wherein the code comprises a first synchronization code provided for synchronizing slot times in the radio receiver and in a base station, and wherein the slot timing of the received signal is detected if a threshold value associated therewith is exceeded.

18. The apparatus according to claim 17, wherein the code comprises a scrambling code, and wherein a cell from which the received signal originates is detected if a threshold value associated therewith is exceeded.

19. The apparatus according to claim 16, wherein the code comprises a second synchronization code provided for synchronizing frame times in the radio receiver and in a base station, and wherein the frame timing of the received signal is detected if a threshold value associated therewith is exceeded.

20. The apparatus according to claim 11, wherein the means for calculating a common correction value which is valid for the plurality of threshold values comprises a dedicated hardware circuit.

* * * * *